Oct. 17, 1961

W. ROTMAN 3,005,201

SANDWICH WIRE ANTENNAS

Filed Nov. 8, 1957

INVENTOR.
WALTER ROTMAN

BY
Sherman H. Goldman
ATTORNEYS

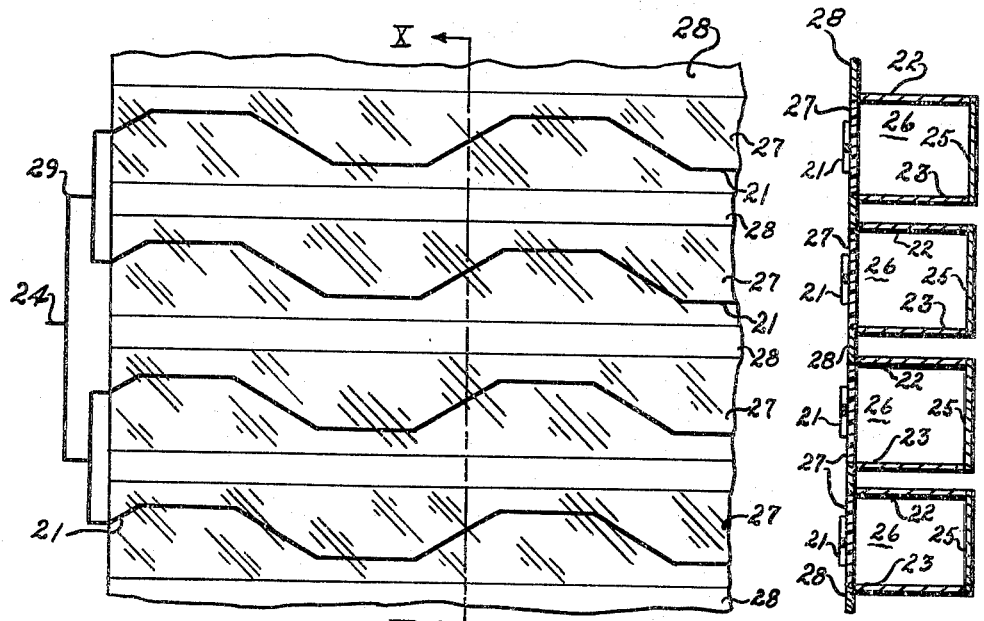
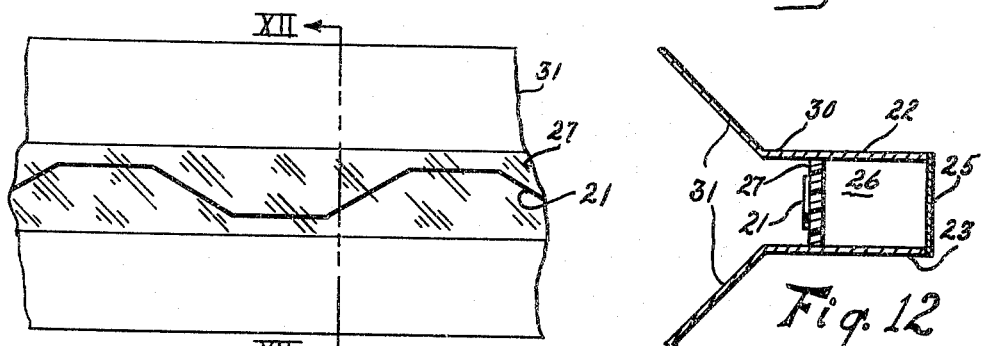
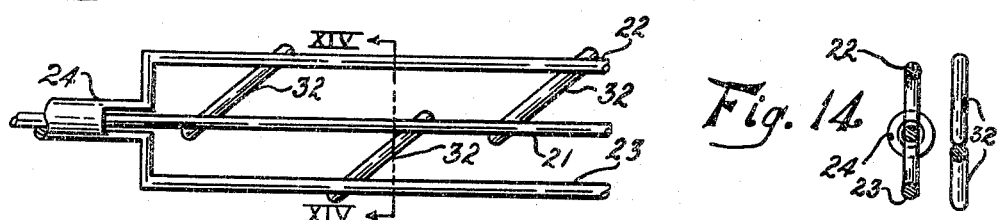
INVENTOR.
WALTER ROTMAN

United States Patent Office 3,005,201
Patented Oct. 17, 1961

3,005,201
SANDWICH WIRE ANTENNAS
Walter Rotman, 8 Chiswick Road, Brighton, Mass.
Filed Nov. 8, 1957, Ser. No. 695,472
13 Claims. (Cl. 343—772)
(Granted under Title 35, U.S. Code (1952), sec. 266)

The invention described herein may be manufactured and used by or for the United States Government for governmental purposes without payment to me of any royalty thereon.

This invention relates generally to antennas and more particularly to a new type of electromagnetic radiator. The novel microwave line source antennas of this invention are designated as sandwich wire antennas because the basic configuration consists of three generally coplanar conductors which form a new type of antenna wherein the outer of the generally coplanar conductors are parallel to one another and are at ground potential while the center conductor, which is excited, is bent in a periodic manner (for broadside radiation) equal to the wavelength. The polarization, therefore, is transverse to the length of the array.

The construction of the antennas of this invention represent a marked advancement in the antenna art due to their mechanical simplicity, adaptability to printed circuit techniques, lower weight and, therefore, lower production, operating and maintenance costs. Furthermore, the impedance characteristics and control over the aperture illumination are very good.

The invention has utility in VHF, UHF and microwave directional antennas for ground, airborne and naval applications, which include radar, communications and navigational devices.

Accordingly, it is an object of this invention to produce a novel antenna construction which is of less weight than standard antennas and is lower in production, operating and maintenance costs.

It is another object of this invention to produce a novel directional electromagnetic radiation or reception device.

It is still another object of this invention to produce a novel antenna comprising three generally coplanar conductors.

A further object of this invention involves a novel antenna which radiates with a bi-directional pattern.

A still further object of the invention involves the production of a novel antenna with a suitable feed system to produce a two-dimensional flat or curved plate radiator.

A still further object of this invention involves the production of a novel parallel plate radiating system.

Another object of this invention involves the production of a novel circularly-polarized antenna with a bi-directional pattern.

Still another object of this invention involves the production of novel antenna elements which form a circularly-polarized, flat or curved plate uni-directional radiator.

Another object of the invention involves the production of a novel antenna with capacitive tabs for reducing the standing wave ratio.

These and other advantages, features and objects of the invention will become more apparent from the following description taken in connection with the illustrative embodiments in the accompanying drawings, wherein:

FIGURE 9 is a sketch of a two-dimensional array with cavity backing;

FIGURE 10 is a cross-sectional view taken along line X—X of FIGURE 9;

FIGURE 11 illustrates schematically a parallel plate sandwich wire feed for a horn;

FIGURE 12 is a cross-sectional view of FIGURE 11 taken along line XII—XII;

FIGURE 13 is a schematic representation of an unbalanced three-wire array of parasitic dipoles;

FIGURE 14 is a cross-section of FIGURE 13 taken along line XIV—XIV;

Throughout the drawings and specification, like numerals are used to designate like parts.

Figure 1:
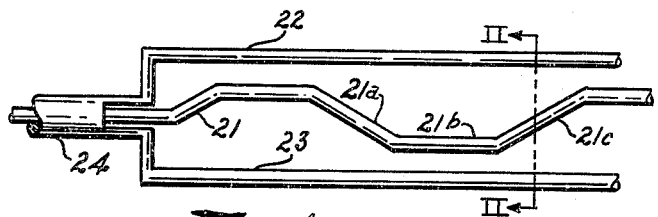
FIGURE 1 is a representation of a basic configuration for broadside radiation.
Figure 2:
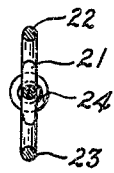
FIGURE 2 is a cross-section along line II—II of FIGURE 1.

The principle of operation of the sandwich wire antenna may be explained with reference to FIGURES 1 and 2. If the center conductor 21 of the three coplanar conductors shown were removed from its proximity to the outer conductors 22 and 23 and excited by a current flow along its length, for example, by an unbalanced coaxial input 24 or a strip transmission line feed, it would tend to radiate. The outer conductors 22 and 23 which are less than a wavelength apart, when brought into the coplanar position, as illustrated in FIGURES 1 and 2, suppress the longitudinal component of radiation while permitting the transverse components of current to radiate. Bending of the center conductor 21 in a periodic manner produces transverse radiation at equally-spaced intervals along the wire with alternate polarity. The electrical phasing between the regions of radiation is determined by the path measured along the length of the center conductor 21, assuming that the current flow is restricted to the direction of the center wire.

The theory may also be explained with reference to the well known flat strip transmission line (not shown) which comprises three parallel plates. The basic field alignment in the strip line is such that most of the field is concentrated in the region of the center strip; however, inclination of the center plate of the strip line from its parallel position converts the energy from a strip transmission line mode to a TEM mode radiating between parallel plates. Since each point of radiation along the line is progressively phased, the radiation tends to be directed in the general direction of propagation of the energy. Broadside radiation is achieved by bending the center strip in a periodic manner. One-half wavelength periodicity introduces phase reversal between successive radiating portions and these regions of maximum horizontal radiation are located at half wavelength intervals thus causing a broadside radiation pattern which is transversely polarized. Reduction of the plates of the flat strip transmission line to thin wires results in the configuration of a practical antenna as disclosed in FIGURE 1.

FIGURES 1 and 2, in addition to representing the principle of operation, illustrate one form of the antenna. The three conductors 21, 22 and 23 are coplanar rods or wires. Center wire 21 is bent in a trapezoidal manner with each leg 21a, 21b and 21c of the trapezoid being one-quarter wavelength long. The legs, 21b, parallel to the outer wires, do not radiate while the inclined sections, 21a and 21c, radiate with an intensity proportional to the inclination angle. Since the inclined wires are electrically phased a half-wavelength apart and phase reversal is present, the structure radiates with a broadside beam. The antenna is essentially a travelling wave array which cannot radiate any component on the longitudinal field because of its cancellation by equal and opposite currents in conductors 22 and 23. The quarter-wavelength of each leg is chosen to aid in the cancellation of reflections from successive discontinuities.

The radiation pattern in the longitudinal plane of this array depends upon the type of termination, in addition to its geometric configuration. In general, the currents on the center wire may be resolved into incident and reflected traveling waves. Each wave produces a single main beam in space which makes equal and opposite angles to the normal to the array. The pattern of the antenna is composed of the vector sum of these two beams whose intensities are proportional to the relative magnitudes of the two waves on the line. Usually, the termination is resistive and matched to the characteristic impedance of the line, in which case only a single traveling wave and single radiated beam exists.

Figure 3A:
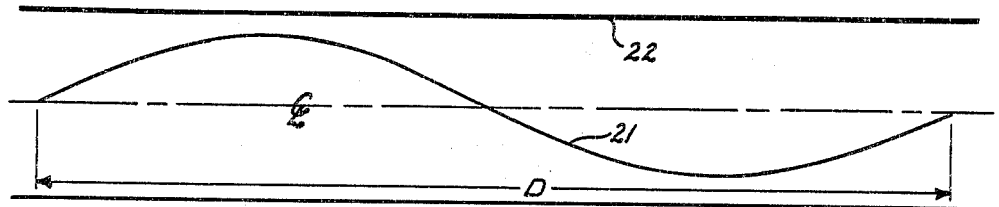
FIGURES 3a and 3b are sketches usable for an analysis of the sandwich wire antenna.
Figure 3B:
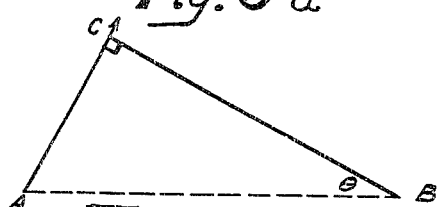

The angle at which the beam radiates depends upon the relative phasing of the radiating regions which, in turn, is a function of the spatial periodicity of the center wire. In FIGURE 1, for which the period is one wavelength, the radiation pattern is exactly broadside to the array. If this periodicity is not a wavelength, the beam emerges at some angle which can be readily computed from the following considerations:

Referring to FIGURES 3a and 3b, the length of the period of the bent center wire 21 is D measured along the center line of the device and L is the measured length of the wire 21. The phase difference, $\phi$, between successive points at half periods along the wire is:

$$\phi = \frac{\pi L}{\lambda_w}$$

where $\lambda_w$ is the wavelength measured along wire 21 as opposed to the wavelength in free space ($\lambda_0$).

Although the radiation is continuous along the inclined portions of 21, the maximum radiation occurs at the intersection of 21 with the center line of the device. Considering these points as discrete radiators, for purposes of analysis, the sandwich wire antenna may be replaced by a linear array of isotropic elements. In accordance with known array theory, the direction $\theta$ of maximum radiation may be computed from the following expression:

$$\frac{\pi L}{\lambda_w} + \pi = \left(\frac{D \sin \theta}{2\lambda_0}\right) 2\pi + 2\pi n$$

$n = -2, -1, 0, 1, 2,$ etc.

The first fraction in the above expression is the electrical distance between radiative sources measured along L; therefore, referring to FIGURE 3b, $AB = D/2$ which is the point of maximum radiation. $\pi$ is added to the last mentioned expression to take into account the presence of phase reversal. The first expression on the right side of the equation represents the electrical distance from point A of FIGURE 3b to the wavefront BC, while the last expression is representative of any multiplicity of electrical cycles. $\theta$ in FIGURE 3b results, therefore, in the angle of maximum radiation.

If the electrical distance L is $<\lambda$ then a solution of the previous equation exists only for $n=1$ which defines the principal beam as $$\theta = \sin^{-1}\left[\frac{\frac{L}{\lambda_w} - 1}{\frac{D}{\lambda_0}}\right]$$

As an illustration, for $L/\lambda_w = 1$, $\theta = 0°$ (broadside); for $L/\lambda_w = 2$ and $D/\lambda_0 = 1$, $\theta = 90°$ (endfire).

Figure 4:
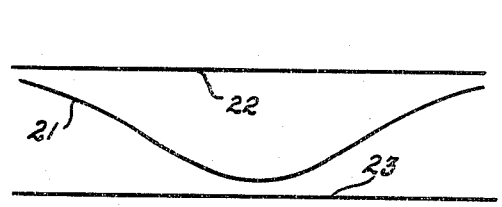
FIGURES 4-6 illustrate schematically some alternative forms of the periodically varying center conductor.
Figures 5, 6:

FIGURES 4 to 6 are representative of various alternate configurations which the center wire or radiator 21 may assume. The designs are intended to be merely illustrative and not all inclusive since the center conductor 21 can have any simple periodic form. In the sinusoidal pattern of FIGURE 4, the triangular pattern of FIGURE 5 and the extended length pattern of FIGURE 6, the intensity of radiation per unit length is a function of the transverse amplitude of the periodically bent center wire 21.

The antenna described with reference to FIGURES 1 and 2 radiates with a bi-directional pattern in the plane transverse to the length of the antenna. A uni-directional pattern may be obtained by placing a large reflector (not shown), spaced some suitable distance like $\lambda/4$ behind the radiators. Quarter-wave metallic insulators may be used to support the wires on the ground plane reflector, if desired.

Figure 7:
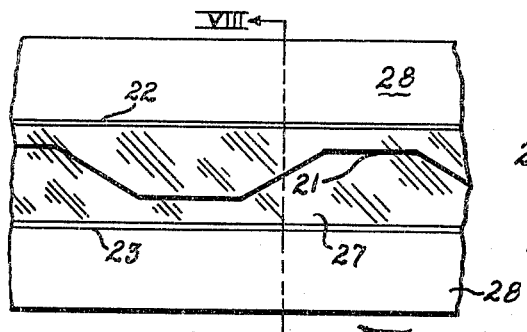
FIGURE 7 illustrates schematically a sandwich wire antenna with cavity backing.
Figure 8:
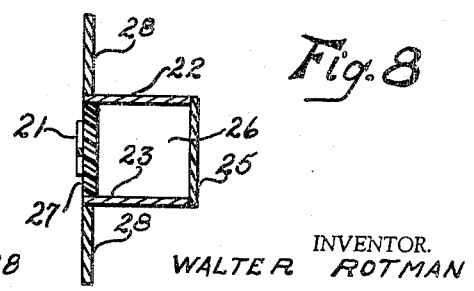
FIGURE 8 is a cross-sectional view taken along line VIII—VIII of FIGURE 7.

An alternate configuration (FIGURES 7 and 8) extends the outer grounded conductors 22 and 23 back to a reflector 25, forming a cavity 26. The center conductor 21 may be printed upon a dielectric sheet 27 which is placed over the cavity. A ground plane 28 is in electrical contact with conductors 22 and 23. Many of these line sources may be mounted adjacent to one another and excited by a suitable feed, such as a strip-line corporate structure, to produce a two-dimensional (an array of arrays) flat plate radiator (as illustrated in FIGURES 9 and 10). An input 24 to a corporate structure made of strip-line or other power dividing network 29 is used to feed the array of FIGURE 9 which radiates a pencil or shaped beam. The sheets containing the bent sandwich wires can be contoured (rather than being flat) to fit curved surfaces, such as the fuselages of aircraft. The distance between elements 22 and 23 are less than a wavelength while the depth of the cavity is approximately $\lambda/4$. Of course the ground planes 28 of FIGURE 9 could be placed behind a single sheet of plastic 27 on which all the center conductors are printed with elements 22 and 23. Stand off insulators may be used to support the ground plane.

According to the embodiment of FIGURES 11 and 12, a line source between parallel plates may be made by extending the two outer conductors 22 and 23 into parallel plates 30 which extend on both sides of the center wire. The uses for such a radiator include feeds for parallel-plate scanning systems, such as the Foster scanner, and as a primary source for illuminating cylindrical reflectors and lenses. The H-plane pattern may be narrowed by flaring the aperture into a horn, as shown at 31 in FIGURE 12. Thus, energy is matched from the parallel plates 30 into space with increased directivity. In these figures the bent sandwich wire is shown printed on a dielectric sheet.

The above-described embodiments are linearly polarized transverse to the length of the array.

A method for obtaining circular or elliptical polarization from the two-dimensional bent sandwich wire antennas will now be described. It is based on the combination of the bent center wire radiating a transversely polarized electric field, together with longitudinally-polarized parasitic dipoles of the type described in patent application 613,011, filed October 1, 1956 by Carlyle J. Sletten. The antenna described therein consists of parasitic resonant rods placed in front of a balanced two-wire line and inclined at a slight angle. This array of parasitic elements could equally well be built on a sandwich wire line (straight center conductor 21) by alternating the parasitic radiators 32 on either side of the center conductor 21 (FIGURES 13 and 14) which may be fed by an unbalanced coaxial or strip line input 24.

For broadside radiation, parasitic dipoles 32, which are one-half wavelength long, are spaced at half-wavelength intervals. The configuration of FIGURE 13 results in the generation of a longitudinal polarization of the electric field.

Figure 15:
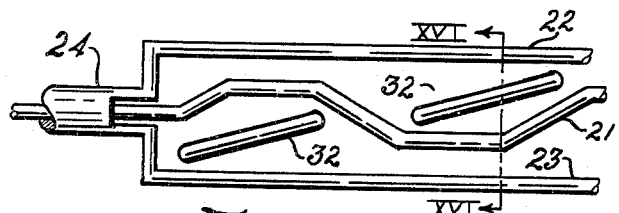
FIGURE 15 illustrates a circularly-polarized sandwich wire antenna.
Figure 16:
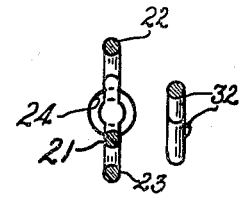
FIGURE 16 is a cross-sectional view of FIGURE 15 taken along line XVI—XVI.

Referring to FIGURES 15 and 16, the radiated fields due to the bent sandwich wire 21 of the antenna and to the parasitic dipoles 32 are orthogonal to each other. Thus, the parasitic elements 32 and the bent center wire 21 may be combined and positioned so that the horizontal and transverse components of electric field are 90° out of phase and equal in intensity, thereby giving circular polarization. The exact position and inclination of the resonant elements will probably have to be determined experimentally.

The configuration for the circularly-polarized radiation device as shown in FIGURES 15 and 16 gives a bidirectional pattern in the plane perpendicular to the antenna which can be changed to a uni-directional pattern by backing up the line source with a large reflector (not shown) spaced about λ/4 from the unit. Alternately, a circularly polarized pattern which is non-directional (uniform) in the transverse plane may be obtained by combining two of the arrays of FIGURE 15 at right angles to each other (not shown). Elements 32 may be supported by any well known means in its particular orientation; furthermore, these dipoles may be positioned on alternate sides of the three wire line.

Figure 17:
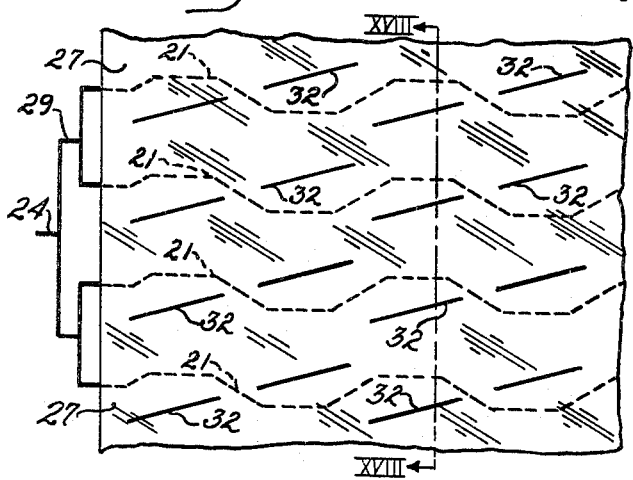
FIGURE 17 is a schematic representation of a circularly polarized, two-dimensional sandwich antenna array.
Figure 18:
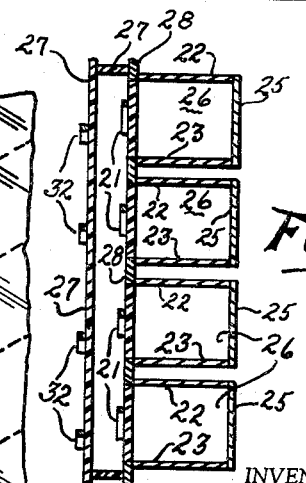
FIGURE 18 is a cross-sectional view of FIGURE 17 taken along line XVIII—XVIII.

A uni-directional, circularly-polarized two-dimensional, flat plate radiator which is adaptable to printed circuit technique is sketched in FIGURES 17 and 18. It consists of rows of bent center wires 21 and of parasitic λ/2 elements printed on two alternate sheets of thin dielectric 27 which are spaced one above the other and backed up by a reflector or series of cavities 26. A corporate structure strip line or similar feed 29 provides a suitable means for exciting the structure.

Figure 19:
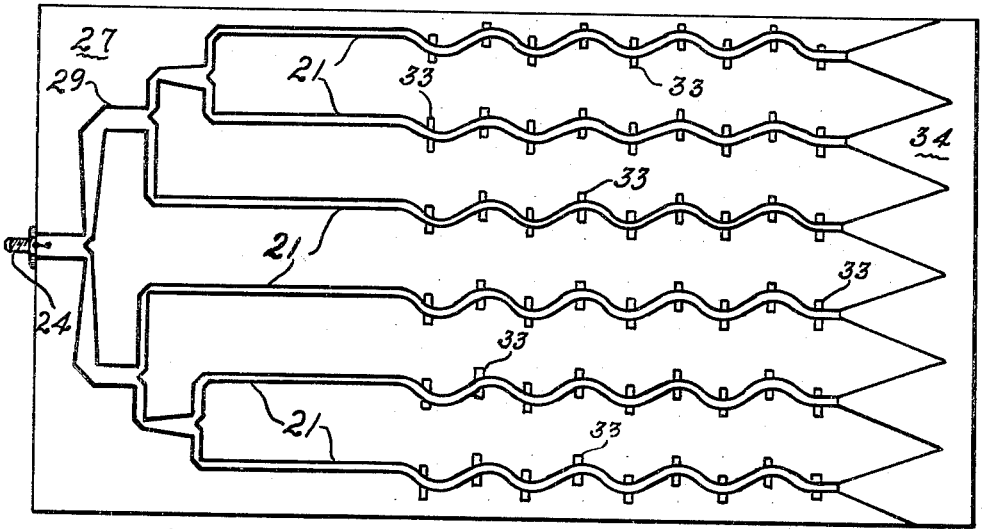
FIGURE 19 is a schematic representation of a sandwich wire antenna with capacitive stubs.

FIGURE 19 shows an extension of the concept of a linearly polarized antenna as illustrated in FIGURES 9 and 10.

For broadside radiation, even with the sinusoidal embodiment of center conductor 21 of FIGURE 4, which has a small change of impedance due to its freedom from discontinuities and irregularities, the cumulative reflections add up in phase to a fairly high input standing wave ratio. At frequencies for which the beam is not broadside, the reflections are not in phase and the input voltage standing wave ratio is low. Accordingly, the capacitive tabs 33 illustrated in FIGURE 19 are utilized at half-wavelength intervals along the array to give a good broadband impedance match. Since these additional reflections cannot add up in phase for any frequency other than for that which gives broadside radiation, the array is automatically compensated in impedance for all frequencies of interest.

The antenna of FIGURE 19 is fed by a suitable corporate network 29. For broadside radiation of a pencil beam, the arrays are fed in phase with the spatial period of each undulation of the sandwich wire array being one wavelength long. The radiation intensity along each array is tapered by varying the amplitude of the undulations in accordance with the relation between the rate of attenuation and undulation amplitudes.

Capacitive tabs 33, spaced at half-wavelength intervals along each center conductor, are of the proper size (less than λ/4) and positioned to cancel the reflections from each undulation; therefore, each array is distributively matched at the resonant frequency. Resistive termination 34 is used to terminate the array. The stubs 33 may be deemed to have a positive susceptance; therefore, their placement at positions where the reflected waves correspond to a negative susceptance along the center conductor produces a cancellation of reflections. No radiation is produced from the stubs 33 since the length is a small part of the wavelength and their position above and below center conductor 21 produces a balanced condition which cancels any radiating component due to the 180° phase shift involved. Of course the length of the array would be chosen for a predetermined beam width.

In all the designs proposed, the amplitude of the bending of the sandwich wire varies as a function of distance along the array to provide tapered illumination. It is felt that the close control of amplitude and phase of the radiated energy which is possible by the techniques described, combined with the simplified construction of bent wires or printed circuitry permits the design of both narrow beam and shaped beam arrays to close specifications for many different antenna applications. Of course, it is understood that the concept or principle of the invention encompasses variances from the embodiments shown; for example, the outer conductors need not be parallel to the center line of the device and may either converge or diverge or, alternately, if parallelism is maintained the outer conductors may be made to undulate rather than being straight. Similarly, the cavity 26 may be formed by extending the outer conductors to form a V, U, or channel shape.

Although the invention has been described with reference to particular embodiments, it will be understood to those skilled in the art that the invention is capable of a variety of alternative embodiments within the spirit and scope of the appended claims.

I claim:

1. A traveling wave sandwich wire antenna comprising a pair of parallel outer conductors at the same reference potential and an end fed inner conductor positioned substantially between said outer conductors, said inner conductor being shaped in an undulative pattern which repeats for a plurality of cycles, said undulations approaching and receding from said outer conductors.

2. An antenna as defined in claim 1 wherein said inner conductor lies in a plane through said pair of outer conductors.

3. An antenna as defined in claim 2 wherein all three of said conductors are of substantially congruent cross-sectional configuration.

4. An antenna as defined in claim 2 wherein said pair of outer conductors are spaced less than one wavelength apart.

5. An antenna as defined in claim 4 wherein said inner conductor undulates with a periodicity equal to the wavelength in order to produce broadside radiation.

6. An antenna as defined in claim 5 including capacitive stubs spaced along said inner conductor to cancel reflections.

7. An antenna as defined in claim 2 including a plurality of parasitic dipoles lying substantially in said plane and alternately positioned on opposite sides of said inner conductor.

8. An antenna as defined in claim 1 wherein said outer conductors are parallel plates and said inner conductor lies in a plane perpendicular to and adjacent one of the ends of said plates and a reflector plate bridging the opposite ends of said parallel plates, thereby forming a cavity behind said inner conductor.

9. An antenna as defined in claim 8 wherein said outer conductors are spaced less than one wavelength apart and said reflector plate is positioned approximately a quarter wavelength behind said inner conductor.

10. An antenna as defined in claim 9 wherein said inner conductor undulates with a periodicity equal to the wavelength.

11. An antenna as defined in claim 10 including capacitive stubs spaced along said inner conductor to cancel reflections.

12. An antenna as defined in claim 8 including a horn comprising a pair of plates flared outwardly from said inner conductor, each of said flared plates being attached to one of said outer conductors at the end opposite said reflector plate.

13. An antenna as defined in claim 8 including a plurality of parasitic dipoles lying substantially in said plane and alternately positioned on opposite sides of said inner conductor.

References Cited in the file of this patent

UNITED STATES PATENTS

| | | |
|---|---|---|
| 1,775,801 | Alexanderson | Sept. 16, 1930 |
| 2,467,578 | Barrow | Apr. 19, 1949 |
| 2,759,183 | Woodward | Aug. 14, 1956 |
| 2,803,008 | Lindenblad | Aug. 13, 1957 |

FOREIGN PATENTS

| | | |
|---|---|---|
| 1,075,433 | France | Apr. 14, 1954 |

OTHER REFERENCES

Pub. (3): "The Excitation of Surface Waveguides and Radiating Slots by Strip-Circuit Transmission Lines," by Frost et al., IRE Transactions, vol. MTT-4 No. 4, October 1956, pp. 218–222.

Pub. (2): Technician, October 1956, page 52, "New Antennas and Accessories," (see Snyder Slide Switch).

Pub. (1): IRE National Convention Record, part I, Mar. 18–21, 1957, "The Sandwich Wire Antenna," pp. 166–172.